Oct. 16, 1928.

G. SOLARZ

BREAD MIXER

Filed Sept. 22, 1926   3 Sheets-Sheet 1

George Solarz
Inventor,

By C. A. Snow & Co.
Attorneys.

Oct. 16, 1928.

G. SOLARZ

BREAD MIXER

Filed Sept. 22, 1926

George Solarz
Inventor

George Solarz
Inventor,
By C. A. Snow & Co.
Attorneys.

Patented Oct. 16, 1928.

1,688,211

UNITED STATES PATENT OFFICE.

GEORGE SOLARZ, OF GALLITZIN, PENNSYLVANIA.

BREAD MIXER.

Application filed September 22, 1926. Serial No. 137,037.

This invention aims to provide a simple but efficient means for mixing dough for bread, cakes, and the like.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1:
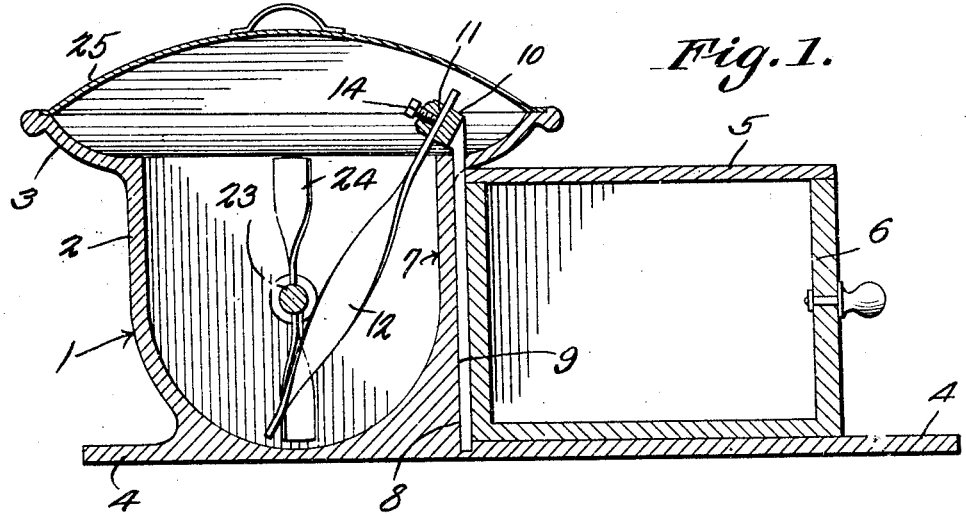
Figure 1 shows in transverse section, a device constructed in accordance with the invention.
Figure 2:
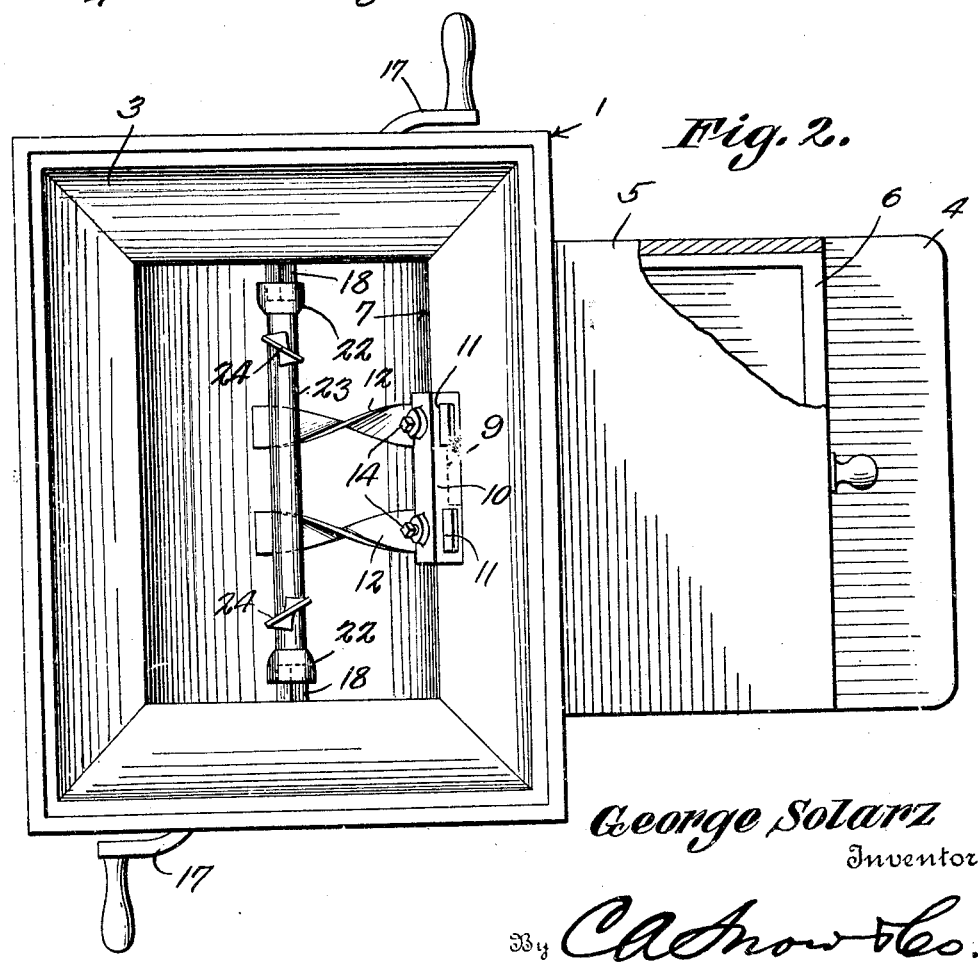
Figure 2 is a top plan wherein parts are broken away.
Figure 3:
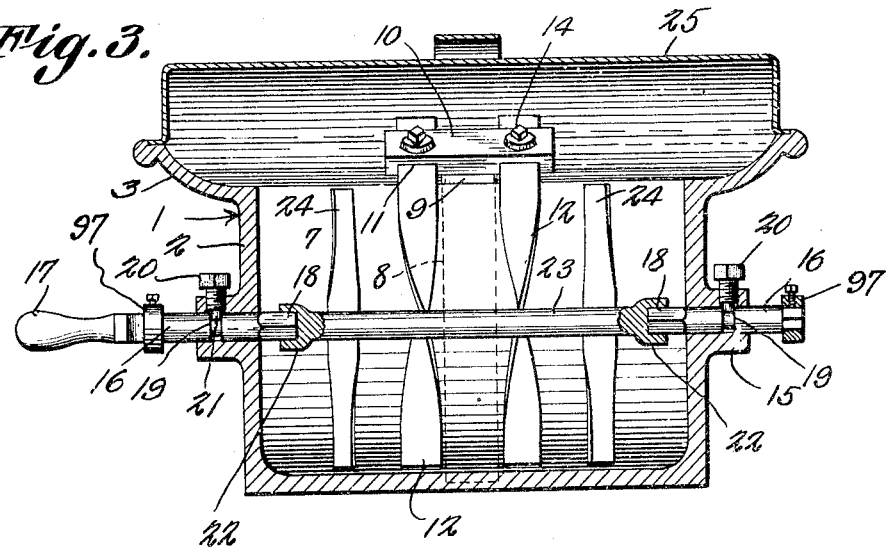
Figure 3 is a longitudinal section taken through the receptacle.

Referring to Figures 1, 2 and 3, there is shown a receptacle 1 including a body 2 having an outstanding upwardly extended flange 3, the receptacle 1 being mounted on a platform 4 which forms the bottom of the receptacle 1, the platform 4 having a casing 5 which is open at one end, a drawer 6 being slidably mounted in the casing 5 and being supported on the platform 4, the drawer being adapted to receive detachable parts of the machine, which will be mentioned hereinafter.

In the inner side wall 7 of the receptacle 1 there is a vertical socket 8 into which may be inserted a standard 9 having an inclined head 10 provided with openings or seats 11 in which fixed blades 12 are mounted at their upper ends, the blades being held in place by set screws 14 threaded into the head 10. There may be as many or as few of the blades 12 as occasion may demand, and the blades may be shaped in a variety of ways, without departing from the spirit of the invention. The blades 12, in the present instance, are twisted, but this is not insisted upon. The blades 12 are disposed at an acute angle to the side wall 7 of the receptacle 1 and extend downwardly into the receptacle to a point beyond the median longitudinal plane of the body 1, as Figure 1 will show clearly.

The body 2 of the receptacle 1 is supplied at its ends with bearings 15 in which are rotatably mounted shafts 16 whereon cranks 17 are detachably mounted as at 97. The inner extremities 18 of shafts 16 are squared. The shafts 16 have circumferential grooves 19, adapted to receive retainers which may be screws 20 threaded into the bearings 15 and having reduced ends 21 received in the grooves 19.

The shafts 16 drive a beater, and are capable of so doing, because the squared ends 18 of the shafts are received in correspondingly shaped sockets 22 formed in the ends of a shaft 23 having blades 24 which cooperate with the fixed blades 12. The receptacle 1 may be surmounted by a lid 25 supported on the flange 3.

In practical operation, when rotation is imparted to the shaft 23 by means of either of the shafts 16 and either of the cranks 17, the rotatable blades 24, cooperating with the fixed blades 12, will knead and beat up the dough, in a way which will be obvious when the drawings are noted. When the occasion for the use of the device has passed, the cranks 17, the beater 23—24, the blades 12, and the standard 9 may be stowed in the drawer 6. The blades 12 may be adjusted in the direction of their length in the head 10 of the standard 9, and may be raised or adjusted vertically, to some extent, also.

Figure 5:
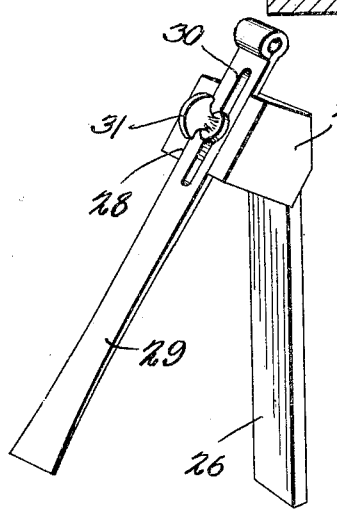
Figure 5 is a perspective view showing a modification in the means for holding the fixed blades.

Reverting to Figure 5 of the drawing, the standard is denoted by the numeral 26, and includes a transverse head 27 having a superficial groove or seat 28 in which is slidable a single blade 29 having an elongated opening 30 through which passes a set screw 31 threaded into the head 27, the set screw serving to bind the blade 29 in the groove 28, and it being possible, also, to adjust the blade endwise. The blade 29 is straight, or nearly so, and Figure 5, compared with Figure 2, for instance, makes it evident that the shape of the blade may be changed, and that there may be many or few of the fixed blades.

Figure 4:
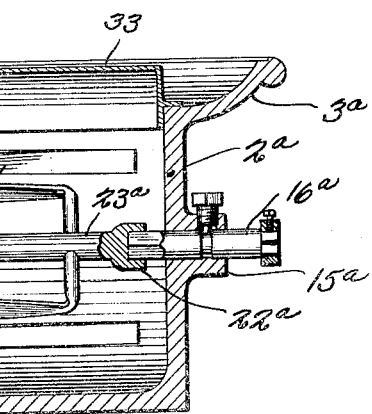
Figure 4 is a section similar to Figure 3 but showing a modification.

In Figure 4 of the drawings, parts hereinbefore described have been designated by numerals previously used, with the suffix "a". In Figure 4, the beater shaft 23ª has rectangular arms 32 which extend outwardly from the shaft 23ª in a radial direction, and then extend longitudinally of the shaft, in parallel relation thereto. In this form of the invention, the high lid shown at 25 is not necessary, and its place is taken by a lower lid 33 which is supported directly on the upper edge of the body 2ª, within the flange 3ª.

Figure 6:
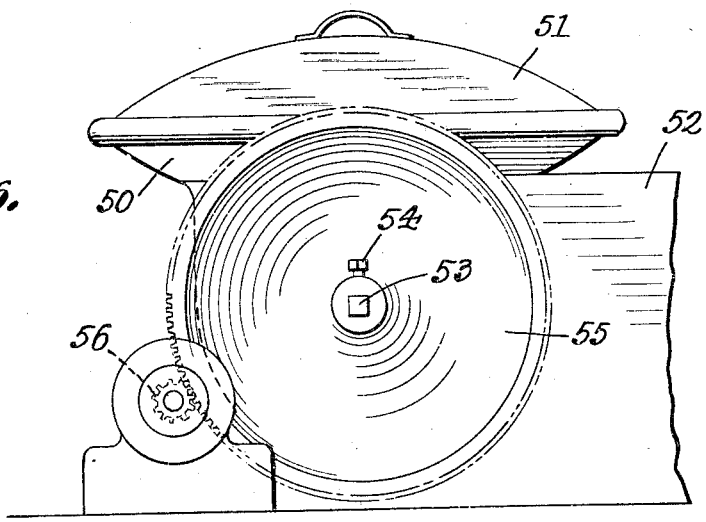
Figure 6 is an elevation showing a modification.

In Figure 6, the receptacle is marked by the numeral 50 and the lid by the numeral 51. The casing for the drawer is shown at 52. The numeral 55 marks one of the shafts, such as the shafts 16 of Figure 3. The cranks 17 of Figure 3 are removed, and a gear wheel 85 is detachably secured at 54 to one of the shafts 53, the gear wheel 85 meshing with a pinion 56 which forms part of an electric motor 57. Figure 6, taken in connection with the description, renders it evident that the device may be operated by power of any kind if desired, rather than by the cranks 17.

Figure 7:
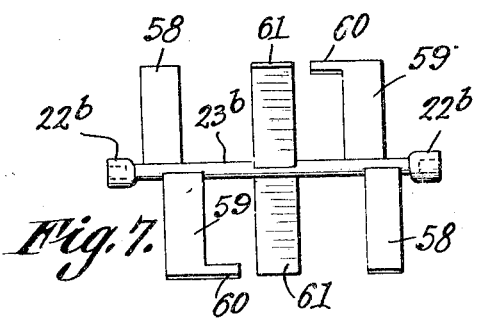
Figures 7, 8, 9 and 10 are perspective views showing modified beaters.

In Figure 7, the beater shaft 23ᵇ has plane blades 58, disposed in diagonally opposite relation to each other, and blades 59 disposed about 180° remote from the blades 58, the blades 59 having inwardly extended fingers 60 at their outer ends. Blades 61 project from the shaft 23ᵇ and are located about 180° remote from each other. The blades 61 are located between the blades 58—59. Each of the blades 59 is located a little nearer to the corresponding blade 61 than is the adjacent blade 58.

Figure 8:
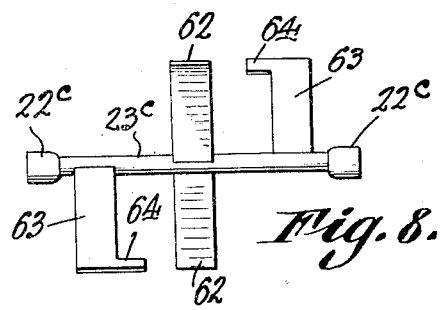

In Figure 8 of the drawings, parts hereinbefore described have been designated by numerals previously used, with the suffix "c". The beater shaft 23ᶜ is supplied with oppositely extended blades 62, corresponding to the blades 61. Blades 63 are located diagonally opposite to each other and project from the shaft 23ᶜ, the blades 63 having inwardly extended fingers 64, disposed approximately parallel to the shaft 23ᶜ.

Figure 9:
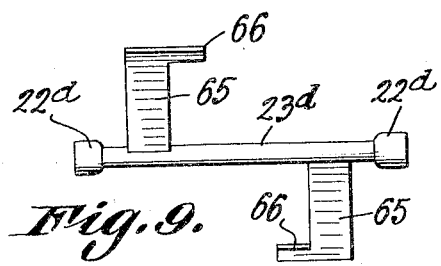

In Figure 9 of the drawings, parts hereinbefore described have been designated by numerals previously used with the suffix "d". The beater shaft 23ᵈ is supplied with oppositely extended blades 65, spaced apart longitudinally of the shaft 23ᵈ, and equipped at their outer ends with fingers 66, located approximately parallel to the shaft 23ᵈ.

Figure 10:
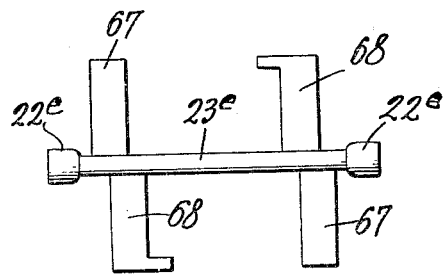

In Figure 10 of the drawings, parts hereinbefore described have been designated by numerals previously used with the suffix "e". The shaft 23ᵉ has blades 67 corresponding to the blades 58 of Figure 7, and blades 68 corresponding to the blades 59, the blades 61 of Figure 7 being omitted.

Figure 11:
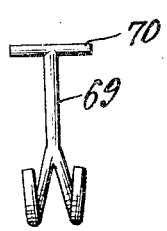
Figure 11 is a perspective view showing the hook.

In Figure 11 there is shown a device for removing the beater shaft. This device includes a shank 69 provided at one end with a transverse handle 70, the shank 69 being equipped at its opposite end with diverging hooks 71. The hooks 71 may be engaged with the shaft 23, to lift the beater out of the dough.

What is claimed is:—

In a device of the class described, a receptacle having a wall provided with a substantially vertical socket, a single removable standard mounted at its lower end directly in the socket in the wall, a transverse head mounted intermediate its ends on the upper end of the standard and having a transverse seat, a blade disposed at an angle to the vertical and extended downwardly into the receptacle, the blade being adjustable in the direction of its length in the seat, a securing device engaging the blade and the head and holding the blade for longitudinal adjustment as aforesaid, and a beater journaled in the receptacle and including a blade located at the side of the blade on the standard, the blade being held in the seat of the standard against lateral swinging movement, thereby to prevent the blade of the standard from engaging the blade of the beater.

In testimony that I claim the foregoing as my own, I have hereto affixed my signature.

GEORGE SOLARZ.